(12) United States Patent
Shearer et al.

(10) Patent No.: US 11,041,716 B2
(45) Date of Patent: Jun. 22, 2021

(54) SYSTEM AND METHOD FOR MONITORING OPERATIONAL PARAMETERS ASSOCIATED WITH A TILLAGE IMPLEMENT DURING THE PERFORMANCE OF A FIELD OPERATION

(71) Applicant: CNH Industrial America LLC, New Holland, PA (US)

(72) Inventors: Scott Shearer, Hilliard, OH (US); Andrew Klopfenstein, West Jefferson, OH (US); Brittany Schroeder, Cloverdale, OH (US)

(73) Assignee: CNH Industrial America LLC, New Holland, PA (US)

( * ) Notice: Subject to any disclaimer, the term of this patent is extended or adjusted under 35 U.S.C. 154(b) by 297 days.

(21) Appl. No.: 16/161,689

(22) Filed: Oct. 16, 2018

(65) Prior Publication Data
US 2020/0116479 A1 Apr. 16, 2020

(51) Int. Cl.
*G01B 21/18* (2006.01)
*A01B 49/04* (2006.01)
*G01B 21/16* (2006.01)

(52) U.S. Cl.
CPC .............. *G01B 21/18* (2013.01); *A01B 49/04* (2013.01); *G01B 21/16* (2013.01)

(58) Field of Classification Search
CPC .......... G01B 21/18; G01B 21/16; A01B 49/04
See application file for complete search history.

(56) References Cited

U.S. PATENT DOCUMENTS

| 4,176,721 | A | 12/1979 | Poggemiller et al. |
| 5,234,060 | A | 8/1993 | Carter |
| 5,902,343 | A | 5/1999 | Hale et al. |
| 6,164,385 | A | 12/2000 | Buchl |

(Continued)

FOREIGN PATENT DOCUMENTS

| EP | 0260113 A2 | 3/1988 |
| WO | WO2017/197292 A1 | 11/2017 |

OTHER PUBLICATIONS

Jang et al., Model for estimating the penetration depth limit of the time-reversed ultrasonically encoded optical focusing technique, Optics Express, vol. 22, Issue 5, Mar. 10, 2014, pp. 5787-5807. https://www.ncbi.nlm.gov/pmc/articles/PMC4086332/ doi: 10.1364/OE.22.005787.

*Primary Examiner* — Bryan Bui
(74) *Attorney, Agent, or Firm* — Rebecca L. Henkel; Rickard K. DeMille

(57) ABSTRACT

In one aspect, a system for monitoring operational parameters associated with a tillage implement may include a first sensor configured to detect data indicative of a first distance between an implement frame forward of a ground engaging tool and a soil surface prior to engagement of the soil by the tool. The system may also include a second sensor configured to detect data indicative of a second distance between the frame aft of the tool and the soil surface following engagement of the soil by the tool. A controller of the system may be configured to determine a soil density change caused by engagement of the soil by the tool based on the first and second distances. Furthermore, the controller may be configured to determine a penetration depth of the tool based at least in part on the determined change in the soil density.

20 Claims, 5 Drawing Sheets

(56) References Cited

U.S. PATENT DOCUMENTS

| | | |
|---|---|---|
| 6,216,795 B1 | 4/2001 | Buchl |
| 6,701,857 B1 | 3/2004 | Jensen et al. |
| 6,791,488 B2 | 9/2004 | Diekhans et al. |
| 8,522,889 B2 | 9/2013 | Adams et al. |
| 8,827,001 B2 | 9/2014 | Wendte et al. |
| 9,433,142 B2 | 9/2016 | Bergen et al. |
| 9,693,496 B2 | 7/2017 | Tevs et al. |
| 2016/0029547 A1 | 2/2016 | Casper et al. |
| 2017/0079194 A1 | 3/2017 | Janelle et al. |
| 2018/0352718 A1* | 12/2018 | Kovach ................ A01B 49/027 |
| 2020/0107494 A1* | 4/2020 | Schoeny ................ A01C 7/205 |

* cited by examiner

200

```
┌─────────────────────────────────────────────────────────────────────┐
│ DETERMINE A FIRST DISTANCE BETWEEN A FRAME OF A TILLAGE IMPLEMENT   │
│ AT A LOCATION FORWARD OF A FIRST GROUND ENGAGING TOOL OF A          │─ 202
│ PLURALITY OF GROUND ENGAGING TOOLS OF THE IMPLEMENT RELATIVE TO A   │
│ DIRECTION OF TRAVEL OF THE IMPLEMENT AND A SOIL SURFACE OF A FIELD  │
│ PRIOR TO ENGAGEMENT OF SOIL BY THE FIRST GROUND ENGAGING TOOL       │
│ BASED ON DATA RECEIVED FROM A FIRST SENSOR                          │
└─────────────────────────────────────────────────────────────────────┘
                                  ↓
┌─────────────────────────────────────────────────────────────────────┐
│ DETERMINE A SECOND DISTANCE BETWEEN A FRAME AT A LOCATION AFT OF    │─ 204
│ THE FIRST GROUND ENGAGING TOOL RELATIVE TO THE DIRECTION OF TRAVEL  │
│ AND THE SOIL SURFACE PRIOR TO ENGAGEMENT OF THE SOIL BY THE FIRST   │
│ GROUND ENGAGING TOOL BASED ON THE DATA RECEIVED FROM A SECOND SENSOR│
└─────────────────────────────────────────────────────────────────────┘
                                  ↓
┌─────────────────────────────────────────────────────────────────────┐
│ DETERMINE A CHANGE IN A SOIL DENSITY OF THE SOIL CAUSED BY          │─ 206
│ ENGAGEMENT OF THE SOIL BY THE FIRST GROUND ENGAGING TOOL BASED ON   │
│ THE DETERMINED FIRST AND SECOND DISTANCES AS THE IMPLEMENT IS       │
│ BEING MOVED ACROSS THE FIELD                                        │
└─────────────────────────────────────────────────────────────────────┘
                                  ↓
┌─────────────────────────────────────────────────────────────────────┐
│ DETERMINE A PENETRATION DEPTH OF THE FIRST GROUND ENGAGING TOOL     │─ 208
│ THROUGH THE SOIL BASED AT LEAST IN PART ON THE DETERMINED CHANGE    │
│ IN THE SOIL DENSITY                                                 │
└─────────────────────────────────────────────────────────────────────┘
                                  ↓
┌─────────────────────────────────────────────────────────────────────┐
│ INITIATE A CONTROL ACTION TO ADJUST AN OPERATIONAL PARAMETER OF THE │─ 210
│ TILLAGE IMPLEMENT WHEN THE DETERMINED PENETRATION DEPTH HAS FALLEN  │
│ OUTSIDE OF A PREDETERMINED PENETRATION DEPTH RANGE                  │
└─────────────────────────────────────────────────────────────────────┘
```

FIG. 5

SYSTEM AND METHOD FOR MONITORING OPERATIONAL PARAMETERS ASSOCIATED WITH A TILLAGE IMPLEMENT DURING THE PERFORMANCE OF A FIELD OPERATION

FIELD

The present disclosure generally relates to tillage implements and, more particularly, to systems and methods for monitoring operational parameters associated with a tillage implement during the performance of a field operation.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as harrow discs, shanks, leveling discs, and/or the like, configured to penetrate the soil to a particular depth. In this regard, the ground engaging tools loosen and/or otherwise agitate the soil to form a seedbed suitable for subsequent planning operations.

It is generally desirable that the seedbed have a uniform depth. However, variations in one or more operating parameters of the tillage implement may cause the ground engaging tools to penetrate the ground to differing depths, thereby resulting in an uneven seedbed. Unfortunately, conventional systems for monitoring the penetration depths of ground engaging tools mounted on a tillage implement are often inaccurate.

Accordingly, an improved system and method for monitoring operational parameters associated with a tillage implement during the performance of a field operation would be welcomed in the technology.

BRIEF DESCRIPTION

Aspects and advantages of the technology will be set forth in part in the following description, or may be obvious from the description, or may be teamed through practice of the technology.

In one aspect, the present subject matter is directed to a system for monitoring operational parameters associated with a tillage implement during the performance of a field operation. The system may include a tillage implement frame having a forward end and an aft end and a plurality of ground engaging tools coupled to the frame and configured to engage the soil to perform a tillage operation as the tillage implement is moved across a field in a direction of travel. The system may also include a first sensor coupled to the frame at a location forward of a first ground engaging tool of the plurality of ground engaging tools relative to the direction of travel. The first sensor may be configured to detect data indicative of a first distance between the frame at the location forward of the first ground engaging tool and a soil surface of the field prior to engagement of the soil by the first ground engaging tool. Furthermore, the system may include a second sensor coupled to the frame a location aft of the first ground engaging tool relative to the direction of travel. The second sensor may be configured to detect data indicative of a second distance between the frame at the location aft of the first ground engaging tool and the soil surface of the field following engagement of the soil by the first ground engaging tool. Additionally, the system may include a controller communicatively coupled to the first and second sensors. The controller may be configured to determine the first and second distances based on data received from the first and second sensors, respectively. The controller may also be configured to determine a change in a soil density of the soil caused by engagement of the soil by the first ground engaging tool based on the first and second distances as the implement is being moved across the field. Furthermore, the controller may be configured to determine a penetration depth of the first ground engaging tool within the soil based at least in part on the determined change in the soil density.

In another aspect, the present subject matter may be directed to a tillage implement. The tillage implement may include a frame extending along a lateral direction between a first end and a second end, with the frame including a forward end and an aft end. The tillage implement may also include a plurality of ground engaging tools coupled to the frame and configured to engage the soil to perform a tillage operation as the tillage implement is moved across a field in a direction of travel, with at least two ground engaging tools of the plurality of ground engaging tools being spaced apart along the lateral direction. Furthermore, the tillage implement may include a first sensor coupled to the frame at a location forward of a first ground engaging tool of the plurality of ground engaging tools relative to the direction of travel. The first sensor may be configured to detect data indicative of a first distance between the frame at the location forward of the first ground engaging tool and a soil surface of the field prior to engagement of the soil by the first ground engaging tool. Moreover, the tillage implement may include a second sensor coupled to the frame a location aft of the first ground engaging tool relative to the direction of travel. The second sensor may be configured to detect data indicative of a second distance between the frame at the location aft of the first ground engaging tool and the soil surface of the field following engagement of the soil by the first ground engaging tool. Additionally, the tillage implement may include a controller communicatively coupled to the first and second sensors. The controller may be configured to determine the first and second distances based on data received from the first and second sensors, respectively. The controller may also be configured to determine a change in a soil density of the soil caused by engagement of the soil by the first ground engaging tool based on the first and second distances as the implement is being moved across the field. Furthermore, the controller may be configured to determine a penetration depth of the first ground engaging tool within the soil based at least in part on the determined change in the soil density.

In a further aspect, the present subject matter is directed to a method for monitoring operational parameters associated with a tillage implement during the performance of a field operation. The tillage implement may include a frame and a plurality of ground engaging tools coupled to the frame, with each ground engaging tool being configured to engage the soil as the tillage implement is moved across a field. The method may include determining, with a computing device, a first distance between the frame at a location forward of a first ground engaging tool of the plurality of ground engaging tools relative to a direction of travel and a soil surface of the field prior to engagement of the soil by the first ground engaging tool based on data received from a first sensor. The method may also include determining, with the computing device, a second distance between the frame at a location aft of the first ground engaging tool relative to the direction of travel and the soil surface of the field following engagement of the soil by the first ground engaging tool based on data received from a second sensor. Moreover, the method may include determining, with the computing device, a change in a soil density caused by engagement of the soil by the first ground engaging tool based on the first and second distances as the implement is being moved across the field. Furthermore, the method may include determining, with the computing device, a penetration depth of the first ground engaging tool through the soil based at least in part on the determined change in the soil density. Additionally, the method may include initiating, with the computing device, a control action to adjust an operational parameter of the agricultural implement when the determined penetration depth has fallen outside of a predetermined penetration depth range.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 illustrates a flow diagram of one embodiment of a method for monitoring operational parameters associated with a tillage implement during the performance of a field operation in accordance with aspects of the present subject matter.

Figure 1:
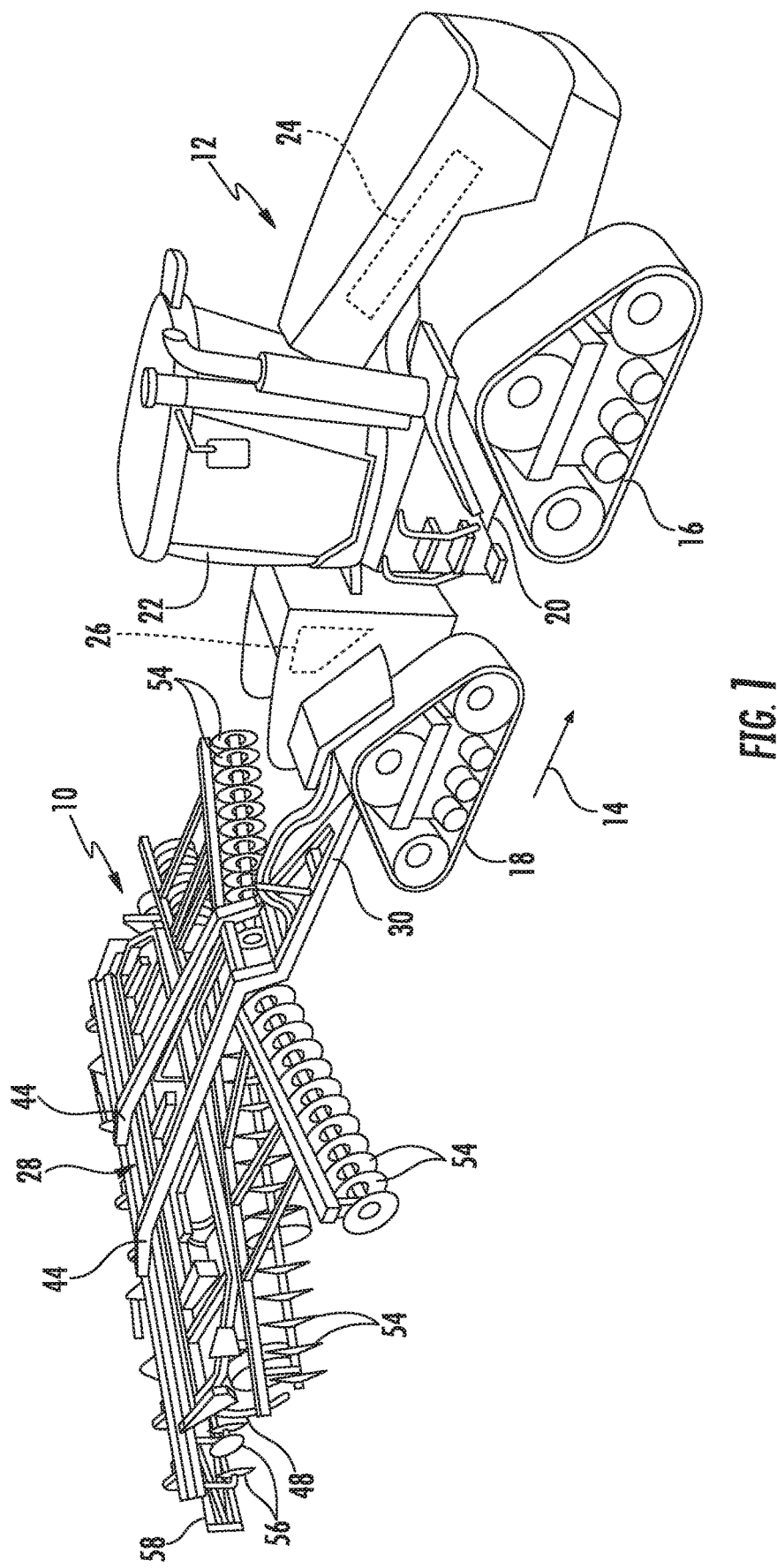
FIG. 1 illustrates a perspective view of one embodiment of a tillage implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring operational parameters associated with a tillage implement during the performance of a field operation. Specifically, in several embodiments, a controller of the disclosed system may be configured to monitor the penetration depths of one or more ground engaging tools mounted on the implement based on the change in soil density caused by engagement of the soil by such ground engaging tool(s). For example, in one embodiment, the controller may be configured to determine a first distance between a frame of the tillage implement at a location forward of the ground engaging tool(s) and the soil surface of the field prior to engagement of the soil by the ground engaging tool(s). Moreover, the controller may be configured to determine a second distance between the frame at a location aft of the ground engaging tool(s) and the soil surface following engagement of the soil by the ground engaging tool(s). Thereafter, the controller may be configured to determine the change(s) in the soil density caused by engagement of the soil by the ground engaging tool(s) during the field operation based on the first and second distances. Based at least in part on the change(s) in soil density, the controller may then be configured to determine the penetration depth(s) of the associated ground engaging tool(s).

Figure 2:
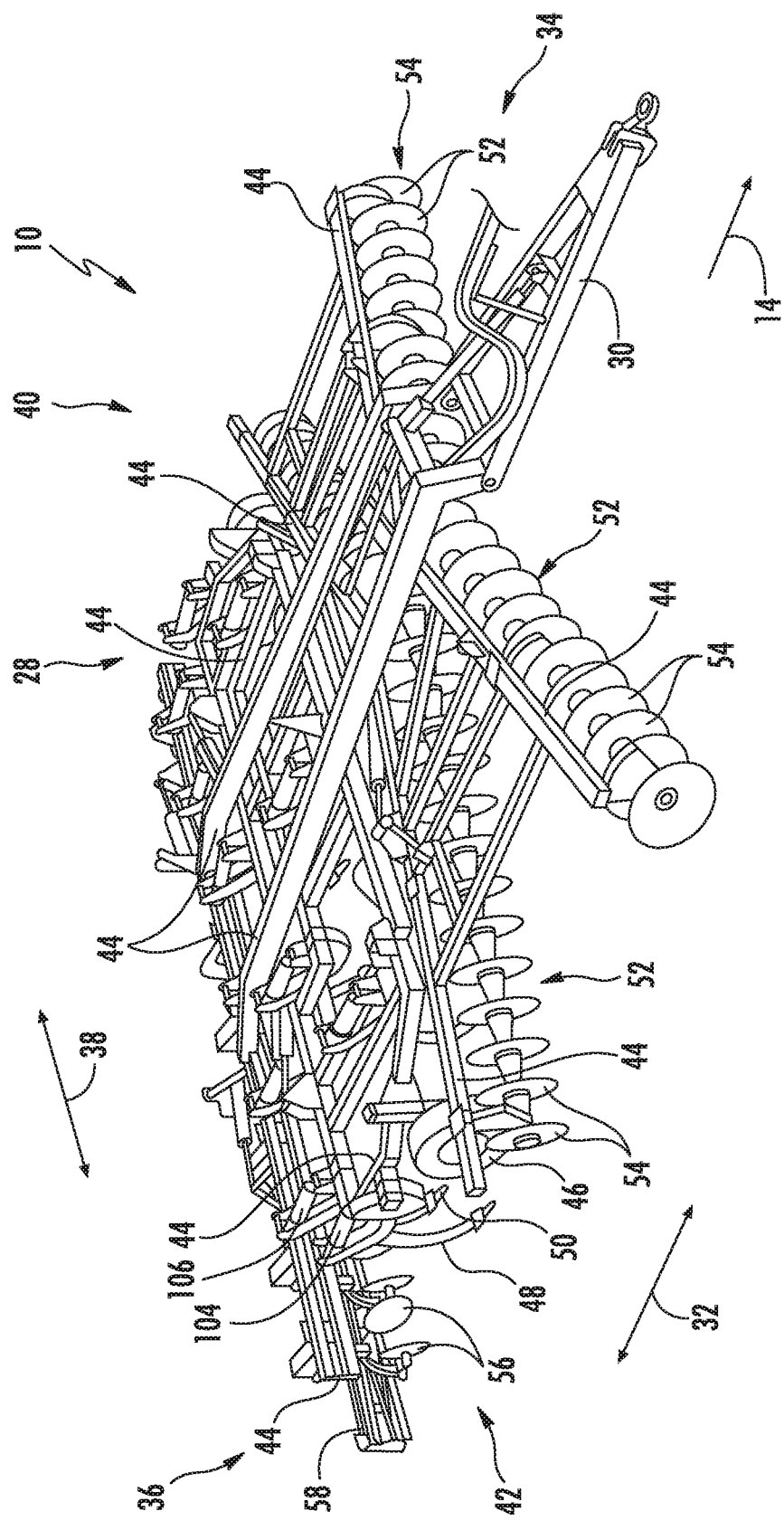
FIG. 2 illustrates an alternative perspective view of a tillage implement in accordance with aspects of the present subject matter.

Referring now to the drawings. FIGS. 1 and 2 illustrate differing perspective views of one embodiment of a tillage implement 10 in accordance with aspects of the present subject matter. Specifically, FIG. 1 illustrates a perspective view of the tillage implement 10 coupled to a work vehicle 12. Additionally, FIG. 2 illustrates a perspective view of the implement 10, particularly illustrating various components of the implement 10.

In general, the implement 10 may be configured to be towed across a field along a direction of travel 14 by the work vehicle 12. As shown in FIG. 1, the work vehicle 12 may be configured as an agricultural tractor. As such, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10 (e.g., a user interface 102 shown in FIG. 4). Furthermore, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed). However, it should be appreciated that, in alternative embodiments, the work vehicle 12 may be configured as any other suitable type of vehicle, such as a wheeled vehicle.

As shown in FIGS. 1 and 2, the implement 10 may generally include a frame 28 configured to be towed by the work vehicle 12 via a pull hitch or tow bar 30 in the direction of travel 14 of the vehicle 12. Specifically, the frame 28 may extend along a longitudinal direction 32 between a forward end 34 and an aft end 36. The frame 28 may also extend along a lateral direction 38 between a first side 40 and a second side 42. In this respect, the frame 28 generally includes a plurality of structural frame members 44, such as beams, bars, and/or the like, configured to support or couple to a plurality of components. Additionally, a plurality of wheels 46 (one is shown) may be coupled to the frame 28 to facilitate towing the implement 10 in the direction of travel 14.

In several embodiments, the frame 28 may configured to support a plurality of shanks 48, 50 configured to rip or otherwise till the soil as the implement 10 is towed across the field. In this regard, the shanks 48, 50 may be configured to engage the soil as the tillage implement 10 is towed across the field. As will be described below, in one embodiment, the shanks 48, 50 may be configured to be pivotally mounted to the frame 28 to allow the shanks 48, 50 to pivot out of the way of rocks or other impediments in the soil. As shown, the shanks 48, 50 may be spaced apart from one another along the lateral direction 38 between the first side 40 and the second side 42 of the frame 28. It should be appreciated that, although only two shanks 48, 50 are identified in FIG. 2, the implement 10 may generally include any number of shanks mounted on the frame 28.

In one embodiment, the frame 28 may be configured to support one or more gangs or sets 52 of disc blades 54. As is generally understood, each disc blade 54 may, for example, include both a concave side (not shown) and a convex side (not shown). Moreover, the various gangs 52 of disc blades 54 may be oriented at an angle relative to the travel direction 14 to promote more effective tilling of the soil. In the embodiment shown in FIG. 2, the implement 10 includes four gangs 52 of disc blades 54, with each gang 52 being coupled to the frame 28 longitudinally forward of the shanks 48, 50. However, it should be appreciated that, in alternative embodiments, the implement 10 may include any other suitable number of disc gangs 52, such as more or fewer than four disc gangs 52. Furthermore, in one embodiment, the disc gangs 52 may be mounted longitudinally aft of the shanks 48, 50.

Additionally, as shown in FIGS. 1 and 2, in one embodiment, the frame 28 may be configured to support other ground engaging tools. For instance, in the illustrated embodiment, the frame 28 is configured to support a plurality of leveling blades 56 and rolling (or crumbler) basket assemblies 58. However, in other embodiments, any other suitable ground-engaging tools may be coupled to and supported by the frame 16, such as a plurality closing discs.

Figure 3:
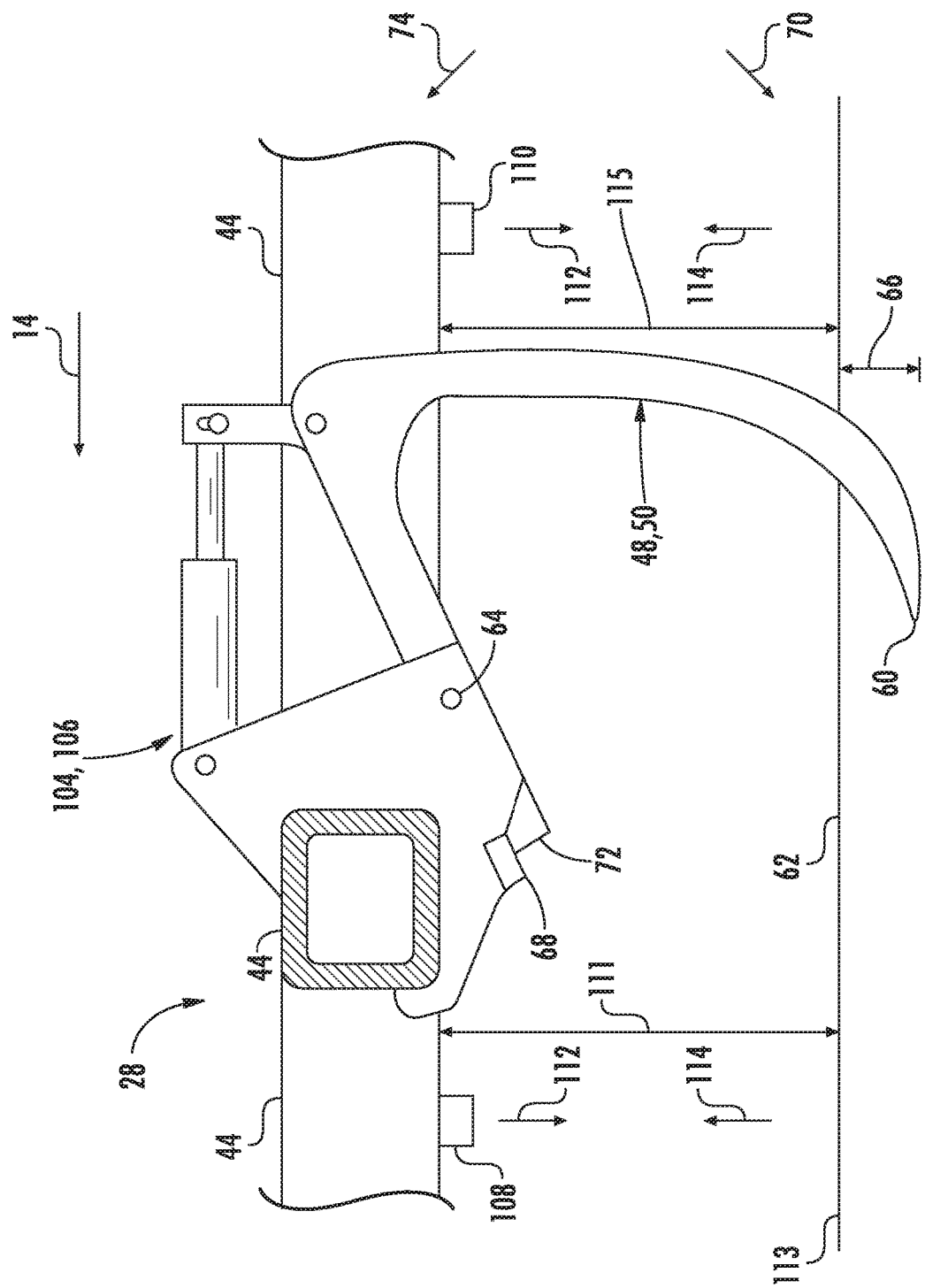
FIG. 3 illustrates a side view of one embodiment of a ground engaging tool of a tillage implement in accordance with aspects of the present subject matter, particularly illustrating first and second sensors located forward and aft of the ground engaging tool, respectively.

Referring now to FIG. 3, a side view of one embodiment of one of the shanks 48, 50 of the tillage implement 10 described above with reference to FIGS. 1 and 2 is illustrated in accordance with aspects of the present subject matter. As indicated above, the shanks 48, 50 may be configured to till or otherwise cultivate the soil. In this regard, one end of each shank 48, 50 may include a tip 60 configured to penetrate into or otherwise engage the ground 62 as the implement 10 is pulled across the field. The opposed end of each shank 48, 50 may be pivotally coupled to the implement frame 28, such as at pivot point 64. In one embodiment, the various shanks 48, 50 of the implement 10 may be configured as rippers. However, one of ordinary skill in the art would appreciate that the shanks 48, 50 may, instead, be configured as chisels, sweeps, tines, or any other suitable type of shanks. Furthermore, it should be appreciated that other shanks coupled to the frame 28 may have the same or a similar configuration as the shank 48, 50 shown in FIG. 3.

In several embodiments, the implement 10 may also include an actuator 104, 106 coupled between the frame 28 and each shank 48, 50. For example, referring briefly back to FIG. 2, a first actuator 104 may be coupled between the implement frame 28 and shank 48, while a second actuator 106 may be coupled between the frame 28 and shank 50. As particularly shown in FIG. 3, each actuator 104, 106 may be configured to bias its corresponding shank 48, 50 to a predetermined shank position (e.g., a home or base position) relative to the frame 28, in general, the predetermined shank position may correspond to the shank position at which each shank 48, 50 penetrates the soil to a desired depth (e.g., as indicated by arrow 66 in FIG. 3). In several embodiments, the predetermined shank position for each shank 48, 50 may be set by a corresponding mechanical stop 68. In operation, each actuator 104, 106 may permit relative movement between its respective shank 48, 50 and the frame 28. For example, each actuator 104, 106 may be configured to bias its corresponding shank 48, 50 to pivot relative to the frame 28 in a first pivot direction (e.g., as indicated by arrow 70 in FIG. 3) until its respective end 72 contacts the corresponding stop 68. Each actuator 104, 106 may also allow its corresponding shank 48, 50 to pivot away from it corresponding predetermined shank position (e.g., to a shallower depth of penetration), such as in a second pivot direction (e.g., as indicated by arrow 74 in FIG. 3) opposite the first pivot direction 70, when encountering rocks or other impediments in the field.

It should be appreciated that the actuators 104, 106 may be configured as any suitable type of actuator configured to bias the shanks 48, 50 relative to the frame 28. For example, in several embodiments, the actuators 104, 106 may be configured as suitable fluid-driven actuators, such as suitable hydraulic or pneumatic cylinders. However, in alternative embodiments, the actuators 104, 106 may be configured as any other suitable type of actuators, such as electric linear actuators. Additionally, in a further embodiment, the implement 10 may include a spring (not shown) configured to bias the shanks 48, 50 relative to the frame 28 in lieu of the actuators 104, 106.

Furthermore, in accordance with aspects of the present subject matter, the implement 10 may include first and second sensors 108, 110 coupled to the frame 28. Specifically, as shown, a first sensor 108 may be coupled to the frame 28 at a location forward of the ground engaging tool 48, 50 relative to the direction of travel 14. As such, the first sensor 108 may be configured to detect data indicative of a first distance (e.g., as indicated by arrow 111 in FIG. 3) between the frame 28 at the location forward of the ground engaging tool 48, 50 and the soil surface (e.g., as indicated by line 113 in FIG. 3) of the field prior to engagement of the soil by the tool 48, 50. Similarly, a second sensor 110 may be mounted at a location aft of the ground engaging tool 48, 50 relative to the direction of travel 14. In this regard, the second sensor 110 may be configured to detect data indicative of a second distance as indicated by arrow 115 in FIG. 3) between the frame 28 at the location aft of the ground engaging tool 48, 50 and the soil surface 113 prior to engagement of the soil by the tool 48, 50. In the illustrated embodiment, the first and second sensors 108, 110 are mounted directly on the bottom side of one of the frame members 44. However, it should be appreciated that, in alternative embodiments, the first and second sensors 108, 110 may be coupled to the frame 28 in any other suitable manner. Furthermore, it should be appreciated that additional sensors 108, 110 may be coupled to the frame 28 at locations forward of and aft of other ground engaging tools of the implement 10 (e.g., other shanks, the disc gangs 52, and/or the leveling discs 56), respectively.

In several embodiments, the first and second sensors 108, 110 may correspond to ultrasonic sensors. In such embodiments, each of the sensors 108, 110 may be configured emit one or more output signal(s) (e.g., as indicated by arrows 112 in FIG. 3) for reflection off of the ground 62. The output signals 112 are, in turn, reflected by the ground 62 as return signals (e.g., as indicated by arrows 114 in FIG. 3). Moreover, the sensor 108, 110 may be configured to receive the associated reflected return signal(s) 114. For example, in one embodiment, the first and second sensor 108, 110 may be configured to determine the time-of-flight (TOF) of the associated signals 112, 114, with the TOF being indicative of the first and second distances 111, 115. However, it should be appreciated that, in alternative embodiments, the sensors 108, 110 may correspond to radio detection and ranging (RADAR) sensors, light detection and ranging (LIDAR) sensors, or any other suitable type of sensors, such as any suitable sensors for detecting the TOF for light or sound beams.

It should be appreciated that the configuration of the tillage implement 10 and the work vehicle 12 described above and shown in FIGS. 1 through 3 is provided only to place the present subject matter in an exemplary field of use. Thus, it should be appreciated that the present subject matter may be readily adaptable to any manner of implement and/or vehicle configuration.

Figure 4:
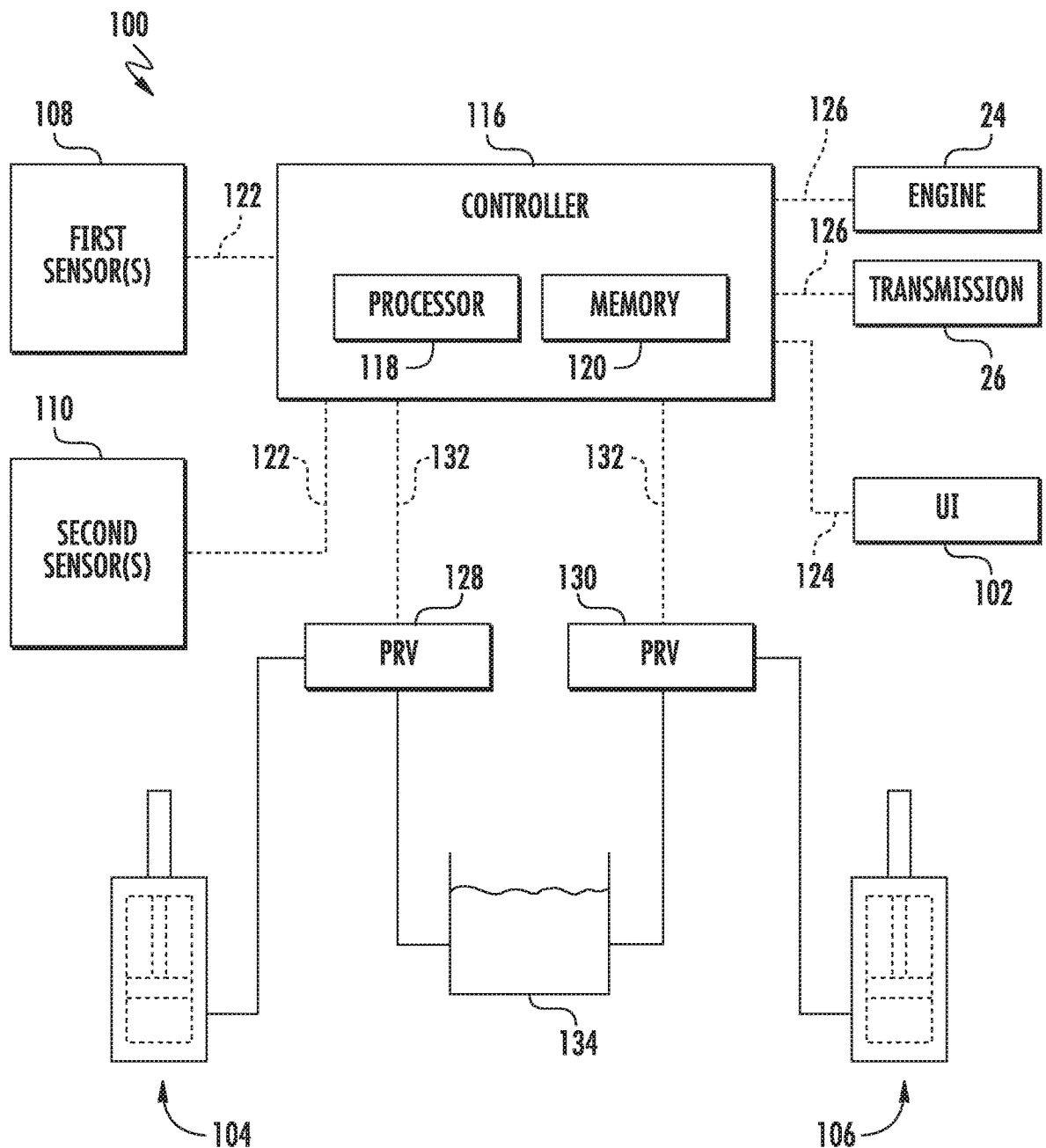
FIG. 4 illustrates a schematic view of one embodiment of a system for monitoring operational parameters associated with a tillage implement during the performance of a field operation in accordance with aspects of the present subject matter.

Referring now to FIG. 4, a schematic view of one embodiment of a system 100 for monitoring operational parameters associated with a tillage implement during the performance of a field operation is illustrated in accordance with aspects of the present subject matter. In general, the system 100 will be described herein with reference to the tillage implement 10 and work vehicle 12 described above with reference to FIGS. 1 through 3. However, it should be appreciated by those of ordinary skill in the art that the disclosed system 100 may generally be utilized with tillage implements having any other suitable implement configuration and/or work vehicles having any other suitable vehicle configuration.

As shown in FIG. 4, the system 100 may include one or more components of the tillage implement 10 and/or work vehicle 12 described above with reference to FIGS. 1 through 3. For example, in several embodiments, the system 100 may include the first and second sensors 108, 110. However, it should be appreciated that the system 100 may include any other suitable components of the implement 10 and/or work vehicle 12, such as the actuators 104, 106.

Moreover, the system 100 may further include a controller 116 configured to electronically control the operation of one or more components of the implement 10 and/or the work vehicle 12. In general, the controller 116 may comprise any suitable processor-based device known in the art, such as a computing device or any suitable combination of computing devices. Thus, in several embodiments, the controller 116 may include one or more processor(s) 118 and associated memory devices) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an electronic control unit (ECU), an application specific integrated circuit, and other programmable circuits. Additionally, the memory device(s) 120 of the controller 116 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD), a hard drive (HD), a solid state drive (SSD), and/or other suitable memory elements. Such memory device(s) 120 may generally be configured to store suitable computer-readable instructions that, when implemented by the processor(s) 118, configure the controller 116 to perform various computer-implemented functions, such as one or more aspects of the method 200 described below with reference to FIG. 5. In addition, the controller 116 may also include various other suitable components, such as a communications circuit or module, one or more input/output channels, a data/control bus and/or the like.

It should be appreciated that the controller 116 may correspond to an existing controller of the implement 10 or the work vehicle 12 or the controller 116 may correspond to a separate processing device. For instance, in one embodiment, the controller 116 may form all or part of a separate plug-in module that may be installed within the implement 10 or the work vehicle 12 to allow for the disclosed system and method to be implemented without requiring additional software to be uploaded onto existing control devices of the implement 10 and/or the work vehicle 12.

Furthermore, in one embodiment, the system 100 may also include a user interface 102. Specifically, the user interface 102 may be communicatively coupled to the controller 116 via a wired or wireless connection to allow feedback signals (e.g., as indicated by dashed line 124 in FIG. 4) to be transmitted from the controller 116 to the user interface 102. As such, the user interface 102 may be configured to provide feedback to the operator of the implement 10 based on the feedback signals 124. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the operator's cab 22 of the work vehicle 12. However, in alternative embodiments, the user interface 102 may have any suitable configuration and/or be positioned in any other suitable location.

In several embodiments, the controller 116 may be configured to determine the change in soil density caused by engagement of the soil by one or more of the ground engaging tools of the implement 10, such as the shanks 48, 50. Specifically, the controller 116 may be communicatively coupled to the first and second sensors 108, 110 via a wired or wireless connection to allow sensor data (e.g., as indicated by dashed lines 122 in FIG. 4) to be transmitted from the first and second sensors 108, 110 to the controller 116. The controller 116 may be configured to determine the first distance 111 prior to engagement of the soil by the shanks 48, 50 based on the data 122 received from the corresponding first sensor(s) 108. Similarly, the controller 116 may be configured to determine the second distance 115 following engagement of the soil by the shanks 48, 50 based on the data 122 received from the corresponding second sensor(s) 108. For example, the controller 116 may include a look-up table, suitable mathematical formula, and/or processing algorithms stored within its memory 120 that correlates the received sensor data 122 to the first and second distances 111, 115. Thereafter, the controller 116 may be configured to determine the change in the densities of the soil prior to and following engagement of the soil by one or more of the shanks 48, 50. In this regard, the controller 116 may be configured to determine or estimate the change(s) in the soil density(ies) based on the difference between the determined first and second distances 111, 115. Specifically, the difference between the first and second distances 111, 115 (i.e., the change in height of the soil) may represent a proportional volumetric change in the soil. Since the mass of the soil remains the same, the change in density may be determined based on the difference between the first and second distances 111, 115. For example, the controller 116 may include a look-up table, suitable mathematical formula, and/or processing algorithms stored within its memory 120 that correlates the difference(s) between the first and second distances 111, 115 to the change(s) in the density(ies) of the soil.

In one embodiment, the controller 116 may be configured to compare the determined change(s) in the soil density(ies) to a predetermined range. In such instance, a maximum differential threshold for the predetermined range may be selected based on the soil density change that, when exceeded, results in or is likely to result in excessive tillage of the soil by the ground engaging tools. Additionally, a minimum differential threshold may also be set for the predetermined range. Specifically, in certain instances, if the determined density change is too small, the ground engaging tools may be providing insufficient tillage to the soil. In this regard, when the determined change(s) in soil the density(ies) exceeds the maximum differential threshold or falls below the minimum differential threshold, the controller 116 may be configured generate an operator notification (e.g., by causing a visual or audible notification or indicator to be presented to the operator of the work vehicle 12 via the user interface 102) that provides an indication that the change(s) in the soil density(ies) is outside of the predetermined range. In such instances, the operator may then choose to initiate any suitable corrective action he/she believes is necessary, such as by adjusting the ground speed of the implement 10 and/or the work vehicle 12 and/or adjusting the position of leveling blades 56 and/or the force of the rolling basket assemblies 58.

Moreover, in several embodiments, the controller 116 may be configured to determine the penetration depths of one or more of the ground engaging tools within the soil based at least in part on the associated change in the soil density. Specifically, the change in soil density caused by the ground engaging tools may, in turn, be indicative of the associated penetration depth of such tools. In addition to the change in soil density, the controller 116 may also be configured to analyze one or more additional factors or parameters when determining the penetration depth, such as the moisture level of the soil, the soil type, and/or residue coverage of the soil being engaged by the ground engaging tools. In such embodiment, the operator of the work vehicle 12 may provide inputs associated with the soil moisture, soil type, and/or residue coverage to the controller 116 via the user interface 102. Additionally, the controller 116 may include a look-up table or suitable mathematical formula stored within its memory 120 that correlates the determined change in soil density, the soil moisture, the soil type, and/or the residue coverage to the penetration depth(s) of the associated tools.

Furthermore, the controller 116 may also be configured to compare the determined penetration depth(s) of the tools to a predetermined penetration depth range. Specifically, the controller 116 may be configured to compare the values associated with the determined penetration depths for each tool to a predetermined maximum penetration depth threshold and a predetermined minimum penetration depth threshold defined for the tools. In the event that the determined penetration depth associated with one or more of the tools exceeds the predetermined maximum penetration depth threshold (thereby indicating that the penetration depth of the associated tools is too great) or falls below the predetermined minimum penetration depth threshold (thereby indicating that the penetration depth of the associated tools is too small), the controller 116 may be configured to initiate a suitable control action. For example, in such instances, the controller 116 may be configured generate an operator notification (e.g., by causing a visual or audible notification or indicator to be presented to the operator of the work vehicle 12 via the user interface 102) that provides an indication that the penetration depth of one or more of the tools is outside of the predetermined penetration depth range. In such instances, the operator may then choose to initiate any suitable corrective action he/she believes is necessary, such as by adjusting the ground speed of the implement 10 and/or the work vehicle 12 and/or adjusting the position of leveling blades 56 and/or the force of the rolling basket assemblies 58.

Moreover, in one embodiment, the controller 116 may be configured to automatically adjust the speed at which the work vehicle 12 is towing the implement 10 across the field when the penetration depth of one or more of the tools falls outside of the predetermined penetration depth range. Specifically, the controller 116 may be communicatively coupled to the engine 24 and/or the transmission 26 of the work vehicle 12 via a wired or wireless connection to allow control signals (e.g., as indicated by dashed lines 126 in FIG. 4) to be transmitted from the controller 116 to the engine 24 and/or the transmission 26. Such signals 126 may be configured to instruct the engine 24 to vary its power output to increase or decrease the speed of the work vehicle 12. For example, when the penetration depth of one or more of the tools exceeds the predetermined maximum penetration depth threshold, the control signals 126 may instruct the engine 24 to decrease its power output (e.g., by decreasing the fuel flow to the engine 24) such that the speed at which the work vehicle 12 is moved across the field is decreased. Conversely, when the penetration depth of one or more of the tools falls below the predetermined minimum penetration depth threshold, the control signals 126 may instruct the engine 24 to increase its power output (e.g., by increasing the fuel flow to the engine 24) such that the speed at which the work vehicle 12 is moved across the field is increased. Furthermore, such control signals 126 may be configured to instruct the transmission 26 to upshift or downshift to change the speed of the work vehicle 12. For example, when the penetration depth of one or more of the tools exceeds the predetermined maximum penetration depth threshold, the control signals 126 may instruct the transmission 26 to downshift such that the speed at which the work vehicle 12 is moved across the field is decreased. Conversely, when the penetration depth of one or more of the tools falls below the predetermined minimum penetration depth threshold, the control signals 126 may instruct the transmission 26 to upshift such that the speed at which the work vehicle 12 is moved across the field is increased. However, it should be appreciated that, in alternative embodiments, the controller 116 may be configured to transmit control signals 126 to any other suitable component of the work vehicle 12 and/or implement 10 such that the speed of the work vehicle 12 and/or implement 10 is adjusted.

Additionally, in several embodiments, when the determined penetration depth of one or more of the tools falls outside of the predetermined penetration depth range, the controller 110 may be configured to automatically adjust the penetration depths of one or more of the tools. Specifically, as shown in FIG. 4, the controller 116 maybe configured to control the operation of the associated tool actuators 104, 106 by actively controlling the operation of associated valves 128, 130, such as pressure regulating valves (PRVs), thereby allowing the controller 116 to actively adjust the penetration depths of the tools. For example, in the illustrated embodiment, the controller 116 may be communicatively coupled to valves 128, 130 to allow control signals (e.g., indicated by dashed lines 132 in FIG. 4) to be transmitted from the controller 116 to the valves 128, 130. In this regard, the controller 116 may be configured to control the operation of the valves 128, 130 in a manner that regulates the pressure of the hydraulic fluid supplied to the associated actuator 104, 106 from a fluid reservoir 134. In such an embodiment, the controller 116 may be configured to control the operation of the PRVs 128,130 such that the fluid pressure supplied to the actuators 104, 106 is one of increased or decreased when it is determined that penetration depths of the associated shanks 48, 50 have fallen below the predetermined minimum penetration depth threshold. One of increasing or decreasing the fluid pressure within the actuators 104, 106 may increase the penetration depths of the associated shanks 48, 50. Conversely, the controller 116 may be configured to control the operation of the PRVs 128,130 such that the fluid pressure supplied to the actuators 104, 106 is the other of increased or decreased when it is determined that penetration depths of the associated shanks 48, 50 have exceeded the predetermined maximum penetration depth threshold. The other of increasing or decreasing the fluid pressure within the actuators 104, 106 may decrease the penetration depths of the associated shanks 48, 50.

Referring now to FIG. 5, a flow diagram of one embodiment of a method 200 for monitoring operational parameters associated with a tillage implement during the performance of a field operation is illustrated in accordance with aspects of the present subject matter. In general, the method 200 will be described herein with reference to the implement 10 and the system 100 described above with reference to FIGS. 1 through 4. However, it should be appreciated by those of ordinary skill in the art that the disclosed method 200 may generally be utilized to monitor operational parameters associated with any tillage implement having any suitable implement configuration and/or in connection with any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include determining, with a computing device, a first distance between a frame of a tillage implement at a location forward of a first ground engaging tool of a plurality of ground engaging tools of the implement relative to a direction of travel of the implement and a soil surface of a field prior to engagement of soil by the first ground engaging tool based on data received from a first sensor. For instance, as described above, the controller 116 may be communicatively coupled to a first sensor(s) 108 configured to capture data 122 indicative of an associated first distance 111 between a frame 28 of the implement 10 at a location forward of one or more of ground engaging tools of the implement 10, such as one or more of the shanks 48, 50, and a soil surface 113 of the field prior to engagement of soil by such ground engaging tool(s). As such, data 122 transmitted from the first sensor(s) 108 may be received by the controller 116 and subsequently analyzed and/or processed to determine the first distance(s) 111 prior to engagement of the soil by the tools.

Additionally, at (204), the method 200 may include determining, with the computing device, a second distance between the frame at a location aft of the first ground engaging tool relative to the direction of travel and the soil surface prior to engagement of the soil by the first ground engaging tool based on data received from a second sensor. For instance, as described above, the controller 116 may be communicatively coupled to a second sensor(s) 110 configured to capture data 122 indicative of an associated second distance 115 between the frame 28 at a location aft of the ground engaging tool(s) and the soil surface following engagement of soil by such ground engaging tool(s). As such, data 122 transmitted from the second sensor(s) 110 may be received by the controller 116 and subsequently analyzed and/or processed to determine the second distance(s) 115 following engagement of the soil by the tools.

Moreover, as shown in FIG. 5, at (206), the method 200 may include determining, with the computing device, a change in a soil density of the soil caused by engagement of the soil by the first ground engaging tool based on the determined first and second distances as the implement is being moved across the field. For instance, as described above, the controller 116 may be configured to determine the change(s) in the soil density(ies) of the soil caused by engagement of the soil by the ground engaging tool(s), such as the shanks 48, 50, based on the difference between the determined first and second distances 111, 115 as the implement 10 is being moved across the field.

Furthermore, at (208), the method 200 may include determining, with the computing device, a penetration depth of the first ground engaging tool through the soil based at least in part on the determined change in the soil density. For instance, as described above, the controller 116 may be configured to the controller 116 may then be configured to determine the penetration depths of the associated shanks 48, 50 based at least partially on the determined change(s) in the soil density(ies).

As shown in FIG. 5, at (210), the method 200 may include initiating, with the computing device, a control action to adjust an operational parameter of the tillage implement when the determined penetration depth has fallen outside of a predetermined penetration depth range. As described above, such control actions may include controlling one or more components of the implement 10 and/or the work vehicle 12. For instance, as indicated above, the controller 116 may be configured to automatically initiate a control action that results in the ground speed of the implement 10 and/or the work vehicle 12 being adjusted, such as by automatically controlling the operation of the vehicle's engine 24 and/or transmission 26. Moreover, as described above with reference to FIG. 4, the controller 116 may also be configured to actively regulate the pressure of the fluid supplied within the associated actuators 104, 106 (e.g., by electronically controlling the associated PRVs 128, 130) to adjust the penetration depths of the shanks 48, 50.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring operational parameters associated with a tillage implement during the performance of a field operation, the system comprising:
    a tillage implement frame including a forward end and an aft end;
    a plurality of ground engaging tools coupled to the frame and configured to engage the soil to perform a tillage operation as the tillage implement is moved across a field in a direction of travel;
    a first sensor coupled to the frame at a location forward of a first ground engaging tool of the plurality of ground engaging tools relative to the direction of travel, the first sensor configured to detect data indicative of a first distance between the frame at the location forward of the first ground engaging tool and a soil surface of the field prior to engagement of the soil by the first ground engaging tool;
    a second sensor coupled to the frame at a location aft of the first ground engaging tool relative to the direction of travel, the second sensor configured to detect data indicative of a second distance between the frame at the location aft of the first ground engaging tool and the soil surface of the field following engagement of the soil by the first ground engaging tool; and
    a controller communicatively coupled to the first and second sensors, the controller being configured to:
        determine the first and second distances based on data received from the first and second sensors, respectively;
        determine a change in a soil density of the soil caused by engagement of the soil by the first ground engaging tool based on the determined first and second distances as the implement is being moved across the field; and
        determine a penetration depth of the first ground engaging tool within the soil based at least in part on the determined change in the soil density.

2. The system of claim 1, wherein each of the first and second sensors corresponds to at least one of a radio detection and ranging (RADAR) sensor, a light detection and ranging (LIDAR) sensor, or an ultrasonic sensor.

3. The system of claim 1, wherein the controller is further configured to determine the penetration depth of the first ground engaging tool based on at least one of soil moisture, soil type, or residue coverage.

4. The system of claim 1, wherein the controller is further configured to initiate a control action when the determined penetration depth has fallen outside of a predetermined penetration depth range.

5. The system of claim 4, wherein the control action is associated with notifying an operator of the tillage implement that the determined penetration depth has fallen outside of the predetermined penetration depth range.

6. The system of claim 4, wherein the control action is associated with reducing a ground speed of the tillage implement.

7. The system of claim 4, wherein the control action is associated with adjusting the penetration depth of the first ground engaging tool.

8. The system of claim 7, wherein the first ground engaging tool is pivotably coupled to the frame, the system further including an actuator coupled between the frame and the first ground engaging tool, the controller being configured to control an operation of the actuator such that the actuator adjusts the position of the first ground engaging tool relative to the frame to adjust the penetration depth of the first ground engaging tool.

9. The system of claim 1, wherein the first ground engaging tool comprises a shank.

10. The system of claim 1, wherein the controller is further configured to generate an operator notification when the determined change in the soil density falls outside of a predetermined range.

11. A tillage implement, comprising:
    a frame extending along a lateral direction between a first end and a second end, the frame including a forward end and an aft end;
    a plurality of ground engaging tools coupled to the frame and configured to engage the soil to perform a tillage operation as the tillage implement is moved across a field in a direction of travel, at least two ground engaging tools of the plurality of ground engaging tools being spaced apart along the lateral direction;
    a first sensor coupled to the frame at a location forward of a first ground engaging tool of the plurality of ground engaging tools relative to the direction of travel, the first sensor configured to detect data indicative of a first distance between the frame at the location forward of the first ground engaging tool and a soil surface of the field prior to engagement of the soil by the first ground engaging tool;
    a second sensor coupled to the frame at a location aft of the first ground engaging tool relative to the direction of travel, the second sensor configured to detect data indicative of a second distance between the frame at the location aft of the first ground engaging tool and the soil surface of the field following engagement of the soil by the first ground engaging tool; and
    a controller communicatively coupled to the first and second sensors, the controller being configured to:
        determine the first and second distances based on the data received from the first and second sensors, respectively;
        determine a change in a soil density of the soil caused by engagement of the soil by the first ground engaging tool based on the determined first and second distances as the implement is being moved across the field, and
        determine a penetration depth of the first ground engaging tool within the soil based at least in part on the determined change in the soil density.

12. A method for monitoring operational parameters associated with a tillage implement during the performance of a field operation, the tillage implement including a frame and a plurality of ground engaging tools coupled to the frame, each ground engaging tool being configured to engage the soil as the tillage implement is moved across a field, the method comprising:
    determining, with a computing device, a first distance between the frame at a location forward of a first ground engaging tool of the plurality of ground engaging tools relative to a direction of travel and a soil surface of the field prior to engagement of the soil by the first ground engaging tool based on data received from a first sensor;

determining, with the computing device, a second distance between the frame at a location aft of the first ground engaging tool relative to the direction of travel and the soil surface of the field following engagement of the soil by the first ground engaging tool based on data received from a second sensor;

determining, with the computing device, a change in a soil density of the soil caused by engagement of the soil by the first ground engaging tool based on the determined first and second distances as the implement is being moved across the field;

determining, with the computing device, a penetration depth of the first ground engaging tool through the soil based at least in part on the determined change in the soil density; and initiating, with the computing device, a control action to adjust an operational parameter of the tillage implement when the determined penetration depth has fallen outside of a predetermined penetration depth range.

13. The method of claim 12, wherein each of the first and second sensors corresponds to at least one of a radio detection and ranging (RADAR) sensor, a light detection and ranging (LIDAR) sensor, or an ultrasonic sensor.

14. The method of claim 12, further comprising:
determining, with the computing device, the penetration depth of the first ground engaging tool based on the first and second distances and at least one of soil moisture, soil type, or residue coverage.

15. The method of claim 12, further comprising:
generating, with the computing device, an operator notification when the determined penetration depth has fallen outside of the predetermined penetration depth range.

16. The method of claim 12, wherein initiating the control action comprises initiating a control action associated with reducing a ground speed of the tillage implement.

17. The method of claim 12, wherein initiating the control action comprises initiating to control action associated with adjusting the penetration depth of the first ground engaging tool.

18. The method of claim 17, wherein the first ground engaging tool is pivotably coupled to the frame, wherein initiating the control action comprises:
controlling, with the computing device, an operation of an actuator coupled between the frame and the first ground engaging tool such that the actuator adjusts the position of the first ground engaging tool relative to the frame to adjust the penetration depth of the first ground engaging tool.

19. The method of claim 12, wherein the first ground engaging tool comprises a shank.

20. The method of claim 19, further comprising:
generating, with the computing device, operator notification when the determined change in the soil density falls outside of a predetermined range.

* * * * *